United States Patent [19]

Kanaoka et al.

[11] Patent Number: 4,548,492
[45] Date of Patent: Oct. 22, 1985

[54] SIDE PRINTING APPARATUS

[75] Inventors: Takeshi Kanaoka; Katutoshi Nakamura; Shigehisa Shimizu, all of Kanagawa, Japan

[73] Assignee: Fuji Photo Film Co., Ltd., Kanagawa, Japan

[21] Appl. No.: 555,537

[22] Filed: Nov. 28, 1983

[30] Foreign Application Priority Data

Nov. 27, 1982 [JP] Japan .............................. 57-208226

[51] Int. Cl.⁴ ...................... G03B 27/48; G03B 27/50
[52] U.S. Cl. ........................................ 355/50; 352/92; 355/64
[58] Field of Search ..................... 355/22–27, 355/31–33, 39, 64, 77, 98, 103, 84, 108, 110, 111, 50; 352/92, 124, 173

[56] References Cited

U.S. PATENT DOCUMENTS 3,888,780  6/1975  Tucker ................................. 352/92

FOREIGN PATENT DOCUMENTS 53-76929  6/1978  Japan .
56-38341  4/1981  Japan .
56-16589  4/1981  Japan .

Primary Examiner—Richard A. Wintercorn
Attorney, Agent, or Firm—Young & Thompson

[57] ABSTRACT

A side printing apparatus for providing on a continuously moving film latent images of characters, numerals, symbols and the like which are later photographically developed. The light image forming arrangement is deenergized so as to prevent the provision of such light images at least during the movement of the film in a reverse direction for preventing double exposure of the film. The deenergization of the light image forming arrangement is caused by a direction discriminator for discriminating the movement of the film in the forward and reverse directions in conformity with two series of pulse signals with a phase difference of 90° therebetween from a rotary encoder rotating in synchronism with the movement of the film.

5 Claims, 2 Drawing Figures

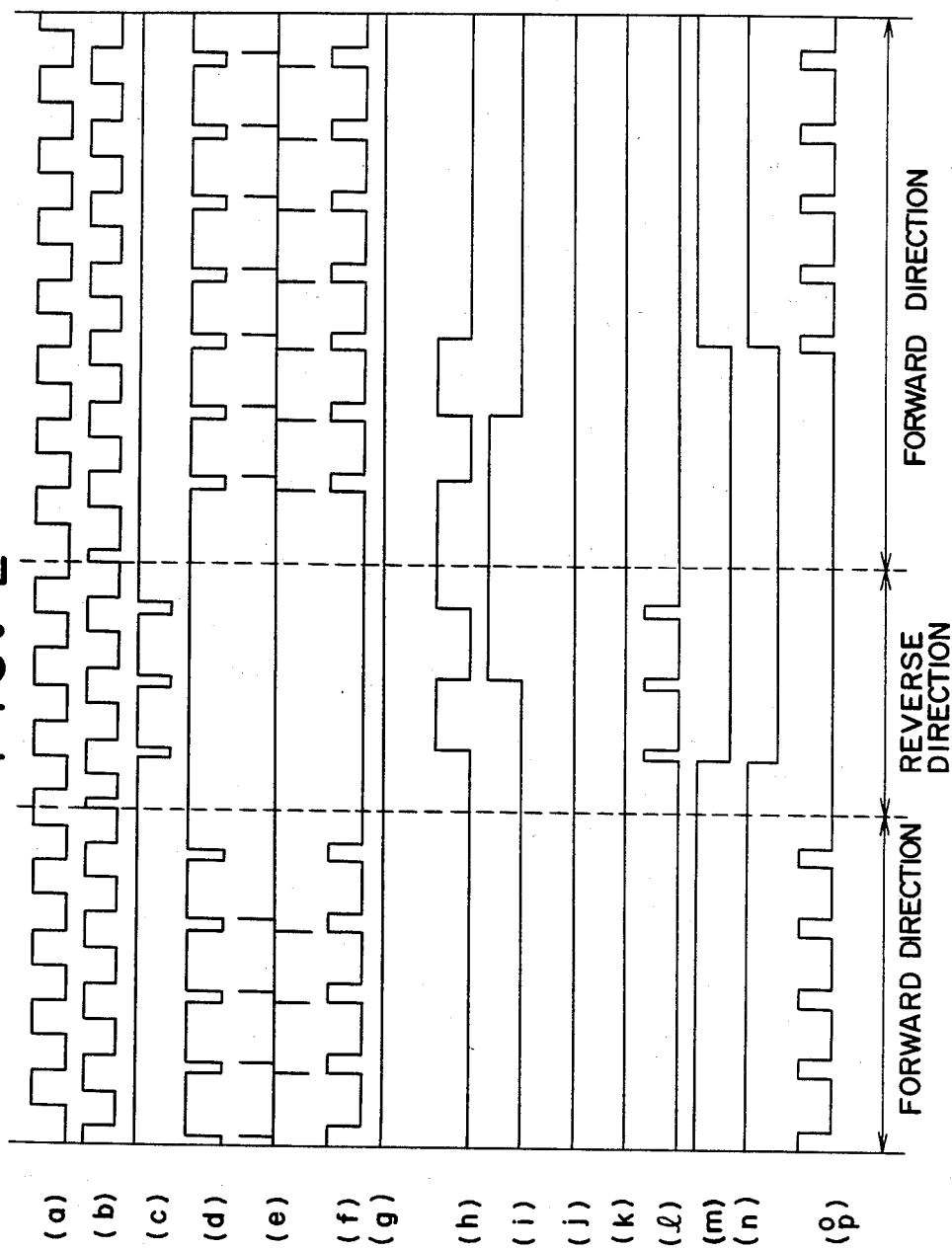

SIDE PRINTING APPARATUS

BACKGROUND OF THE INVENTION

The present invention relates to a printing apparatus by which a photosensitive product is provided with latent images of characters, numerals, symbols marks or the like during the manufacture of the photographic product.

In the manufacture of photosensitive products such as photographic film, paper or the like (which is herein generically referred to as a "film"), it is usual to provide a film with latent images of characters, numerals, symbols, marks the like (which are herein generically referred to as "characters") which are later photographically developed during the processing of the exposed film, for providing information marks such as manufacturer's name, date, film type, frame numbers, frame size and the like along the longitudinal sides or margins of the film. One way of so marking a film, which is generally called side printing, is to optically form light images of characters on the film at the longitudinal margins adjacent each picture frame during the film manufacture, the film being thereby produced with latent images of characters, which characters are later photographically developed during the processing of the exposed film.

Apparatus for producing a film with such latent images of characters as aforementioned, which is generally called side printing apparatus, is well known as indicated by Japanese utility model No. 16589/1981, Japanese Patent unexamined publication Nos. 42037/1982 and 163226/1982 and Japanese utility model unexamined publication No. 38341/1981. Such apparatus are divided into four types in accordance with the forms of the light image providing means. One form is a projection means in which a character pattern plate and a light source for illuminating the pattern plate are used to form light images of characters. Another is a light emitting diode (LED) matrix array in which a plurality of LEDs are selectively energized to form light images of characters. The third is a liquid crystal display device in combination with light source, and the fourth is a cathode ray tube (CRT) display device.

Such side printing apparatus have been so improved that the forming of light images is caused in synchronism with the motion of the film in a forward direction by detecting the moved length of the film so as to provide latent images on the film at predetermined positions, and in that the interval for which the light image forming device is maintained energized is varied according to changes in the speed of motion of the film for the purpose of producing positive images of characters of uniform density.

One of the problems associated with the side printing apparatus above described is improper exposures characterized by double exposures on film which result in the printed characters being so over-exposed that it is hard to make them out. Such double exposures occur upon the motion of film in a reverse direction which is caused either when the tension applied to the film changes unexpectedly or when the film is suddenly stopped and there is retrogressive motion of the film transfer mechanism.

SUMMARY OF THE INVENTION

It is therefore a primary object of the present invention to provide a side printing apparatus which prevents double exposure of a film, even though motion of the film in a reverse direction is induced.

It is another object of the present invention to provide a side printing apparatus which provides latent image characters precisely along the longitudinal margins of a film, even though the file moves in a reverse direction.

In accomplishing these and other objects, the present invention provides an apparatus which is characterized in that a light image forming device is deenergized so as to prevent forming light images of characters at least during the movement of a film in a reverse direction. The movement of the film in forward and reverse directions is discriminated by a direction discriminator which, in turn, is adapted to receive two series of pulse signals with different phases from each other produced by a detector for detecting the moved length of the film and then to generate a series of forward direction pulse signals when the film is moving in the forward direction and a series of reverse direction pulse signals when the film is moving in the reverse direction. In this specification the word "forward direction pulse signals" means the pulse signals which show that the direction of the moving film is in the forward direction. The word "reverse direction pulse signals" means the pulse signals which show that the direction of the moving film is in the reverse direction. An up/down counter which counts up the reverse direction pulse signals commences counting down the forward direction pulse signals and provides a signal which energizes the light image forming device previously deenergized at the time the up/down counter reaches a predetermined count.

BRIEF DESCRIPTION OF THE DRAWINGS

These and other objects and features of the present invention will become apparent from the following description taken in conjunction with the preferred embodiment thereof shown in the accompanying drawings, in which;

FIG. 2 is a timing chart of the side printing apparatus of FIG. 1.

DETAILED DESCRIPTION OF THE INVENTION

Figure 1:
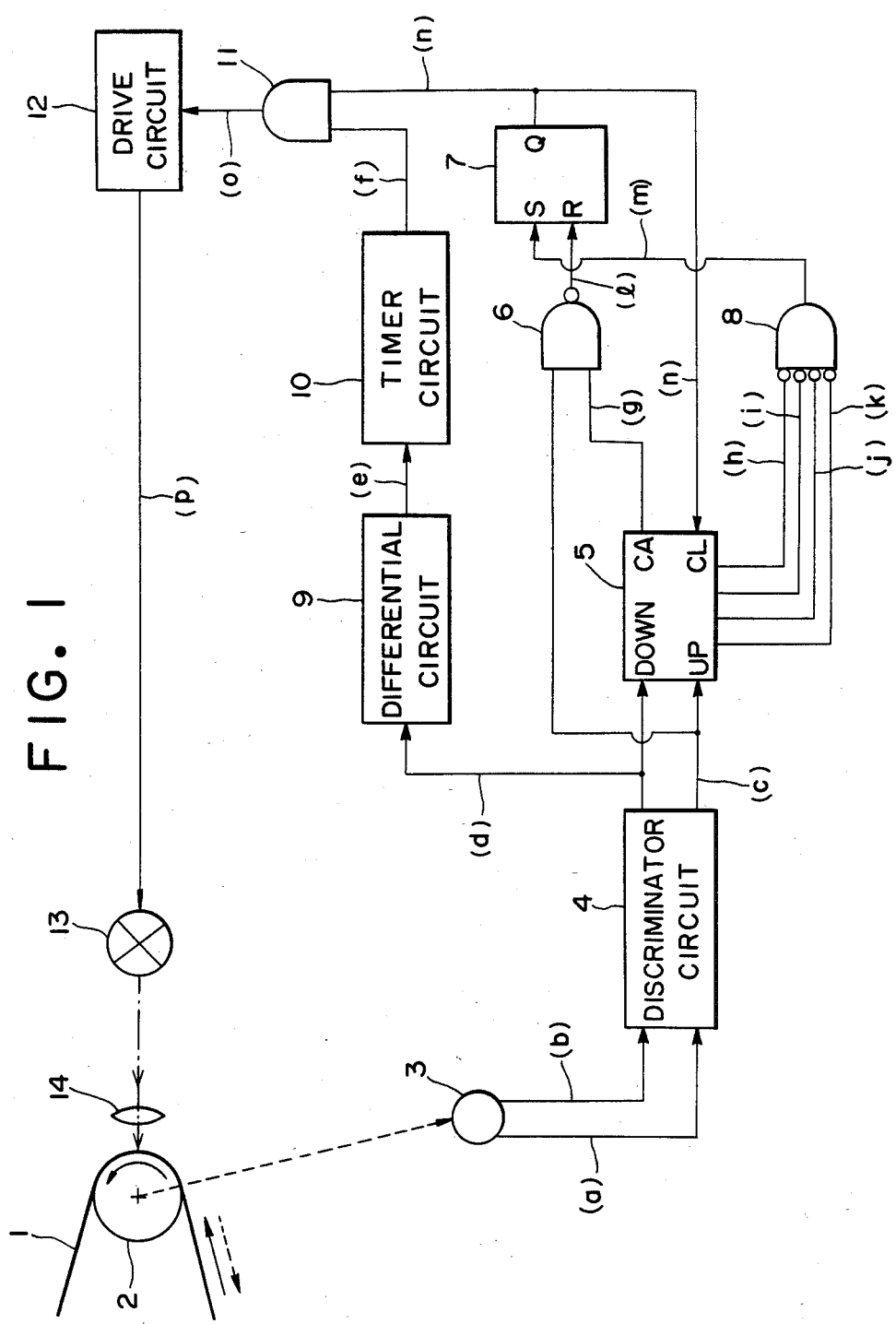
FIG. 1 is a block diagram showing a side printing apparatus of a preferred embodiment of the present invention.

A preferred embodiment of the invention will be now described with reference to the drawings. As shown in FIG. 1, a film moves usually with continuous uniform motion in a forward direction shown by the solid line arrow. A rotatable drum 2 which holds the film 1 in close contact with the peripheral surface thereof in the focal plane of a focusing lens 14 or lens system is adapted to rotate as a result of the continuous motion of the film.

It should be noted that a retrogressive motion of the drum 2 is likely to be induced either when the tension applied to the film changes unexpectedly or when a film transfer mechanism is suddenly stopped, causing the movement of the film in the reverse direction shown by the dotted line arrow.

A rotary encoder 3 which is operationally associated with the drum 2 is provided for the purpose of generating two series of pulse signals (a), (b) which are given a phase difference of 90° therebetween. Another means, for instance a perforation detector adapted to produce pulse signals corresponding to the detection of perforations of the film 1, may be substituted for the rotary encoder 3. A discriminator circuit 4 receives the two series of pulse signals (a) and (b) from the rotary encoder 3 and then produces either a series of forward direction pulse signals (d) to be directed to the count down terminal of up/down counter 5 or a series of reverse direction pulse signals (c) to be directed to a count up terminal of the up/down counter 5 in comformity to the interrelationship between the two. The up/down counter 5 is adapted to count up the reverse direction pulse signal and to count down the forward direction pulse signal. The reverse direction pulse signals (c) and carrier signal (g) from the up/down counter 5 are directed to NAND circuit 6 for providing a signal which, in turn, operates to reset a flip-flop 7. The flip-flop 7 initially assumes a low output signal level (n) at its Q terminal upon being reset, which signal (n) is directed to a clear terminal of the up/down counter 5 so as to cause it to commence counting. Signals (h), (i), (j) and (k) from other output terminals of the up/down counter 5 are directed to an AND circuit 8 which, in turn, provides a high output signal (m) for setting the flip-flop 7 when all the signals (h) to (k) are at a low output signal level. The flip-flop 7, upon being set, changes its output state at the Q terminal from a low output signal level to a high output signal level thereby signaling the up/down counter 5 to stop counting.

A differentiation circuit 9 which differentiates the forward direction pulse signals (d) provides differential signals (e) which, in turn, operate to cause the operation of timer circuit 10 for providing output pulse signals (f). An AND circuit 11 which receives the output signals (f) and (n) provides output pulse signals (o) directed to a drive circuit 12. The drive circuit 12 is adapted to controllably drive the light image forming device 13 so as to produce light images of characters while the AND circuit 11 maintains its output state at a high output signal level. The light image forming device 13 of the aforementioned type is driven to produce light images of characters which are focused, thereby providing the latent images on the margin or margins of the film 1.

FIG. 2 shows the waveforms of the signals (a) through (p) indicated in FIG. 1. When the film 1 moves continuously in the forward direction, the flip-flop 7 is set to produce a high output signal level (n) thereby maintaining the up/down counter 5 inoperative with all its output signals (h), (i), (j) and (k) at a low output signal level. Corresponding to the production of forward direction pulse signals (d) in synchronism with the motion of the film 1 in the forward direction, the timer circuit 10 produces output signals (f) which, through the AND circuit 11, operate to actuate the drive circuit 12 so as to cause the light image forming device 13 to be energized. As a result, the film 1 is produced with latent images, for instance frame number.

On the other hand, when the film 1 moves in the reverse direction shown by the dotted line arrow in FIG. 1, the direction discriminator circuit 4 produces a series of reverse direction pulse signals (c), which signals operate to reset the flip-flop through the NAND circuit 6, resulting in a low output signal level (n) at the Q terminal. Upon the change of the output state at the Q terminal of the flip-flop 7 from a high output signal level to a low output signal level, the up/down counter 5 commences counting and simultaneously, the drive circuit 12 causes deenergization of the light image forming arrangement 13 so as to provide no latent image on the film.

As the up/down counter 5 is adapted to count up the reverse direction pulse signals and to count down the forward direction pulse signals, the up/down counter 5 changes all its output signals (h), (i), (j) and (k) to a low level when the film 1 moves in the forward direction by a distance equal to the length by which the film 1 has moved in the reverse direction, setting the flip-flop 7. Cosequently, the drive circuit 12 is operated to energize the light image forming device 13 again so as to provide latent images of characters on the film 1.

The side printing apparatus, which discontinues producing light images until a film moves in the forward direction a distance equal to the moved length thereof in the reverse direction, prevents the double exposure of the film to light images which causes an exposed negative image when the film is later photographically developed. The prevention of double exposure results in the elimination of production of film with characters inferiorly provided thereon.

Although the present invention has been described in conjunction with a long web such as photographic film, printing paper and the like, it is applicable to disk type films in rotational motion. Furthermore, this invention can be applied not only to the processes of film manufacture but also to the printing process for providing identifying information such as the customer's name, date information and the like on printed papers in a laboratory.

It will be apparent to those skilled in the art from the foregoing description of the present invention that various improvements and modifications can be made in it without departing from its scope. The embodiment described herein is merely illustrative and should not be viewed as the only embodiment that might be encompassed by the appended claims.

What is claimed is:

1. A side printing apparatus for providing latent images of characters, numerals, symbols and the like on a photographic film moving continuously by exposing it to light images produced by a light image forming device, said apparatus comprising:

film length detection means for detecting the moved length of the film so as to produce a first series of pulse signals corresponding to the movement of the film in a forward direction and a second series of pule signals corresponding to the movement of the film in a reverse direction;

an up/down counter for counting up said reverse direction pulse signals and counting down said forward direction pulse signals; and a drive circuit for controlling said light image forming device; said up/down counter commencing counting up at the beginning of the production of said reverse direction pulse signals and simultaneously said drive circuit causing de-energization of said light image forming device, said up/down counter stopping counting down upon reaching a predetermined count down of said forward direction pulse signals and simultaneously said drive circuit causing energization of said light image forming device, thereby preventing double exposure of the film.

2. A side printing apparatus as defined in claim 1 further comprising a flip-flop which is adapted to be set to produce output signals when said up/down counter reaches a predetermined count and to be reset when said reverse direction pulse signal is produced so as to cause said up/down counter to commence counting.

3. A side printing apparatus as defined in claim 2 further comprising a timer circuit which operates from said forward direction pulse signals to produce output signals and an AND circuit to which said output signals from said timer circuit and flip-flop are applied, said AND circuit producing output signals which operate to energize said drive circuit.

4. A side printing apparatus as defined in claim 1 wherein said film length detection means is actuated by rotation of a rotary drum driven by said film.

5. A side printing apparatus as defined in claim 4 wherein said film length detection means comprises a rotary encoder which is rotated with said rotary drum and a discrimination circuit, said rotary encoder producing both a third and a fourth series of pulse signals which are different in phase from each other corresponding to the direction of the movement, and said discrimination circuit producing said forward direction pulse signals and reverse direction pulse signals in conformity to the relationship in phase between said third and fourth series of pulse signals.

* * * * *